E. A. BARBER.
FLUID PRESSURE BRAKE FOR RAILWAY CARS.
APPLICATION FILED MAR. 30, 1912.
1,040,846.
Patented Oct. 8, 1912.
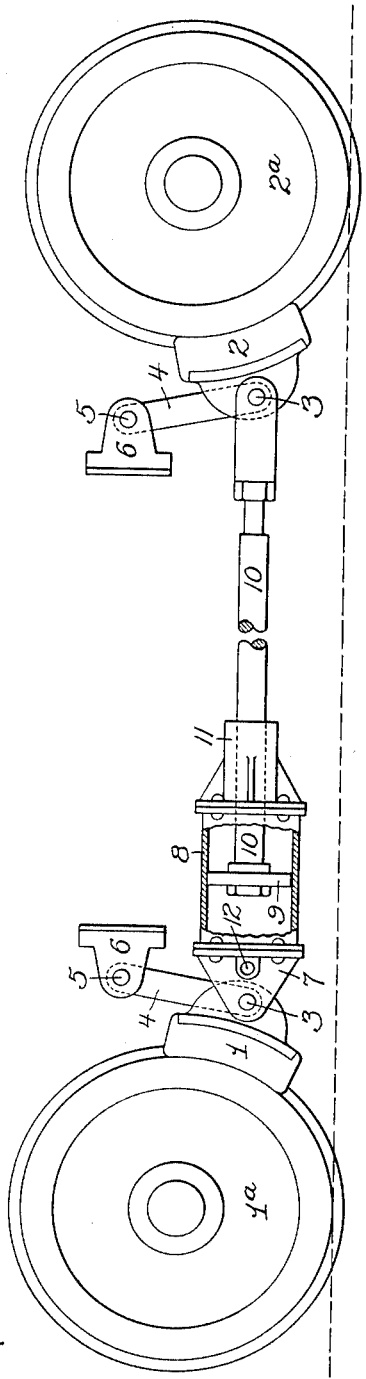
WITNESSES
Elsie Fullerton
Hamilton D. Turner
INVENTOR
EDWARD A. BARBER
BY HIS ATTORNEY
Harry Smith

UNITED STATES PATENT OFFICE.

EDWARD A. BARBER, OF YORK, PENNSYLVANIA, ASSIGNOR TO BARBER CAR COMPANY, OF YORK, PENNSYLVANIA, A CORPORATION OF PENNSYLVANIA.

FLUID-PRESSURE BRAKE FOR RAILWAY-CARS.

1,040,846.  Specification of Letters Patent.  Patented Oct. 8, 1912.

Application filed March 30, 1912. Serial No. 687,522.

*To all whom it may concern:*

Be it known that I, EDWARD A. BARBER, a citizen of the United States, residing in York, Pennsylvania, have invented certain Improvements in Fluid-Pressure Brakes for Railway-Cars, of which the following is a specification.

My invention relates to that class of car brakes in which the brake shoes are actuated by fluid pressure in a cylinder located between the opposite brake shoes, and it relates especially to that type of such brakes in which the cylinder is connected to one brake shoe and the piston rod to the opposite brake shoe whereby, when the fluid under pressure is admitted to the cylinder behind the piston therein, the said piston and its rod and the brake shoe connected thereto will be forced in one direction and the cylinder itself and the brake shoe connected thereto will be forced in the opposite direction.

The object of my invention is to so construct a car brake of this type as to prevent strain and wear upon the cylinder, piston or piston rod by reason of the fact that the opposite brake shoes do not happen to be in horizontal alinement. This object I attain in the manner hereinafter set forth, reference being had to the accompanying drawing, which represents, partly in side elevation and partly in section, car brake apparatus constructed in accordance with my invention.

My invention has been designed mainly for use in connection with single truck street cars, although it may, if desired, be used in other car structures where its functions would suggest such use.

In the drawing, 1 represents one of the brake shoes for application to the wheel 1ª and 2 represents the opposite brake shoe for application to the wheel 2ª, each of the brake shoes being pivotally mounted at 3, to the lower end of a depending link 4 whose upper end is pivotally mounted at 5 to a bracket 6 which is intended to be suitably supported upon the rigid framework of the truck.

Pivotally connected at 3 to the brake shoe 1 is a projecting bracket 7 on the rear head of the brake cylinder 8 which contains a piston 9 with rod 10, the latter passing through a tubular guide 11 on the front end of the cylinder and being pivotally connected at its outer end as at 3 to the brake shoe 2. When, therefore, fluid under pressure is admitted to the cylinder between the rear head of the same and the piston 9 said cylinder will be thrust rearwardly and the piston will be thrust forwardly so as to forcibly apply the brake shoe 1 to the wheel 1ª and the brake shoe 2 to the wheel 2ª.

As the cylinder 8 is not rigidly connected to any part of the truck it is free to move backwardly and forwardly as is required in the system of braking above described and owing to its pivotal connection with the brake shoe 1 it is also free to swing in a vertical plane passing through the axial line of the piston and piston rod, and through the pivots 3, whereby connection is made between the cylinder 8 and the brake shoe 1 and the piston rod 10 and brake shoe 2, consequently it is immaterial what the vertical relation of one brake shoe in respect to the other may be, since any departure of these brake shoes from true horizontal alinement will not cause any departure from their true alinement of the peripheral face of the piston 9 and the inner face of the cylinder 8 or of the outer face of the piston rod 10 and the bore of the tubular guide 11 on the head of the cylinder, consequently any strain or wear upon either cylinder, piston or piston rod which might result from such lack of proper alinement is effectually prevented.

I am therefore enabled to cause the piston rod 10 to fit so snugly to the bore of the guide 11 as to prevent the access of water, mud, dust, snow, or ice to the forward end of the cylinder while still permitting flow of air into and through the same as the piston moves forwardly or rearwardly in the cylinder.

I have shown my invention as applied to a brake in which the cylinder and piston rod are connected directly to opposite brake shoes, the brake cylinder being therefore employed in connection with a single pair of wheels. My invention is also applicable to that class of brakes in which the brake shoes are mounted upon the opposite ends of brake beams or bars extending across the truck, one shoe being applied to the wheel at one side of the truck and the other to a wheel at the opposite side of the truck. In such case the cylinder 8 may be pivotally mounted upon one brake beam and the piston rod 10 may be pivotally connected to the other brake beam, hence in claiming pivotal connection between the brake shoes and the cylinder and piston rod I do not necessarily mean direct pivotal connections between these members.

The fluid under pressure will be introduced into the rear end of the cylinder 8 in any available manner, for instance, through a passage formed in the rear head of the cylinder and in a hollow boss 12 thereon, said passage being in communication with the pressure main preferably by means of a flexible connection which will not interfere with the free backward and forward movement of the cylinder.

I claim:

Car brake mechanism in which are combined, opposite brake shoes, a cylinder having pivotal connection with one of said brake shoes, and a piston in said cylinder having a rod which is in pivotal connection with the opposite brake shoe, said pivotal connections providing the sole support for the cylinder and piston.

In testimony whereof, I have signed my name to this specification, in the presence of two subscribing witnesses.

EDWARD A. BARBER

Witnesses:
 GUY WEBSTER,
 S. B. MEISENHELDER.

---

Copies of this patent may be obtained for five cents each, by addressing the "Commissioner of Patents, Washington, D. C."